(12) United States Patent
Raphael et al.

(10) Patent No.: US 7,590,761 B2
(45) Date of Patent: Sep. 15, 2009

(54) SECURE GATEWAY WITH ALARM MANAGER AND SUPPORT FOR INBOUND FEDERATED IDENTITY

(75) Inventors: Adonny William Raphael, Holmdel, NJ (US); Robert Rhea Seibel, Waretown, NJ (US)

(73) Assignee: Avaya Inc, Basking Ridge, NJ (US)

( * ) Notice: Subject to any disclaimer, the term of this patent is extended or adjusted under 35 U.S.C. 154(b) by 752 days.

(21) Appl. No.: 11/294,961

(22) Filed: Dec. 6, 2005

(65) Prior Publication Data

US 2007/0130326 A1 Jun. 7, 2007

(51) Int. Cl.
*G06F 15/16* (2006.01)
*G06F 12/00* (2006.01)
(52) U.S. Cl. .................................. 709/249; 709/226
(58) Field of Classification Search ................. 709/203, 709/226–227, 238, 250, 249
See application file for complete search history.

(56) References Cited

U.S. PATENT DOCUMENTS

| 6,513,129 | B1 | 1/2003 | Tentij et al. |
| 6,898,710 | B1 * | 5/2005 | Aull ........................... 713/182 |
| 2005/0060328 | A1 * | 3/2005 | Suhonen et al. ............. 707/100 |
| 2005/0114701 | A1 | 5/2005 | Atkins et al. |
| 2005/0278547 | A1 | 12/2005 | Hyndman et al. |
| 2006/0002401 | A1 * | 1/2006 | Mukherjee et al. .......... 370/401 |
| 2006/0029032 | A1 * | 2/2006 | Allan et al. .................. 370/351 |
| 2006/0143702 | A1 * | 6/2006 | Hisada et al. ................. 726/15 |

FOREIGN PATENT DOCUMENTS

| GB | 0616895.9 | 10/2006 |
| WO | 2005032041 | 4/2005 |

OTHER PUBLICATIONS

U.S. Appl. No. 10/939,694, filed Sep. 13, 2004, Ganesh et al.
Juniper Networks Advanced Feature Set, Data Sheet, 2 pages, Jul. 2005.
Juniper Networks Secure Access 700, Data Sheet, 4 pages, Nov. 2005.
Juniper Networks Secure Access 2000, Data Sheet, 4 pages, Nov. 2005.
Juniper Networks Secure Access 4000, Data Sheet, 4 pages, Nov. 2005.
Juniper Networks Secure Access 6000, Data Sheet, 4 pages, Nov. 2005.
Juniper Networks Secure Access 6000 SP, Data Sheet, 4 pages, Nov. 2005.
Aventail EX-2500, EX-1500, and EX-750, Data Sheet, pp. 1-4, 2005.
Permeo Base5, Datasheet, 2 pages, 2005.
Liberty Alliance Project, "Liberty ID-FF Architecture Overview," Version: 1.2-errata-v1.0, pp. 1-44, 2005.
Dr. Mark Lewney, "GB U.S. Application No. 0616895.9 Search Report", Oct. 31, 2006, Publisher: The Patent Office, Published in: GB.

* cited by examiner

*Primary Examiner*—Zarni Maung
(74) *Attorney, Agent, or Firm*—Ryan, Mason & Lewis, LLP

(57) ABSTRACT

An SSL VPN gateway or other type of secure gateway is operative to control access to an enterprise network of a communication system. The gateway in accordance with an aspect of the invention comprises an alarm manager. The alarm manager receives an alarm from a vendor product that is part of a set of internal resources of the enterprise network, and routes the alarm to an external service provider for processing. The gateway receives from the service provider, responsive to the alarm, a federated identity which encompasses a plurality of technicians, expert systems or other servicing elements of the service provider. The gateway may grant one or more particular servicing elements of the service provider access to the alarm-generating vendor product based on the federated identity.

20 Claims, 2 Drawing Sheets

SECURE GATEWAY WITH ALARM MANAGER AND SUPPORT FOR INBOUND FEDERATED IDENTITY

FIELD OF THE INVENTION

The invention relates generally to the field of communication systems, and more particularly to secure sockets layer (SSL) virtual private network (VPN) gateways and other types of secure gateways which are used to control access to internal resources of enterprise networks from external servers and other devices.

BACKGROUND OF THE INVENTION

A typical conventional SSL VPN gateway is configured to provide browser-based access to the internal resources of an enterprise network. Such internal resources may comprise servers, computers or other processing devices, from many different vendors, and running a wide variety of different protocols. Inbound transactions directed to the gateway are generally initiated using standard protocols such as hypertext transfer protocol (HTTP) or HTTP secure sockets (HTTPS). An SSL VPN gateway is not itself a firewall, but is instead usually located within the enterprise behind the firewall.

Examples of conventional SSL VPN gateways include the SA 700, SA 2000, SA 4000, SA 6000 and SA 6000 SP products commercially available from Juniper Networks, Inc. of Sunnyvale, Calif., USA, the EX-2500, EX-1500 and EX-750 products commercially available from Aventail Corp. of Seattle, Wash., USA, and the Permeo Base5 product commercially available from Permeo Technologies, Inc. of Austin, Tex., USA.

A significant drawback associated with conventional VPN gateways of the type listed above is that it can be difficult to handle alarms generated by internal resources of the enterprise. Such resources often comprise products from multiple vendors. Each vendor may have an external service provider that provides customer support for the products of that vendor. A given service provider may comprise, for example, technicians and expert systems that can process the alarms to resolve whatever problems may exist in the corresponding vendor products. Exemplary expert systems that may be used to process alarms are described in U.S. patent application Ser. No. 10/939,694, filed Sep. 13, 2004 in the name of inventors S. Ganesh et al. and entitled "Distributed Expert System for Automated Problem Resolution in a Communication System," which is commonly assigned herewith and incorporated by reference herein.

Generally, the conventional SSL VPN gateways are not configured to deliver alarms from multi-vendor products to their associated service providers, or to allow the service providers access to the products that generated the alarms. In many cases, a customer may have to call the service provider in order to let them know of a problem that has resulted in an alarm. The customer would then have to provide explicit authorization to allow a technician or expert system of the service provider to gain access to the product in order to resolve the problem.

Also, conventional SSL VPN gateways are typically designed to authenticate single users. It is impractical to authenticate the hundreds or even thousands of technicians that may be associated with the service providers that support the various multi-vendor products in a given enterprise. Service provider technicians may have to use hardware tokens or other similar mechanisms to obtain access to an enterprise network, and each service provider technician would have to use different sets of hardware tokens for each customer, which is impractical and expensive. Moreover, authenticating large pools of multi-vendor service provider technicians can place an excessive burden on the administration, authorization and authentication (AAA) server of a given enterprise, which is clearly undesirable.

It is therefore apparent that a need exists for an improved SSL VPN gateway, which can provide more efficient handling of alarms from multi-vendor products that are part of the internal resources of an enterprise network.

SUMMARY OF THE INVENTION

The present invention in an illustrative embodiment overcomes the above-noted drawbacks of the prior art by providing an SSL VPN with an alarm manager and support for inbound federated identity.

In accordance with one aspect of the invention, an SSL VPN gateway or other type of secure gateway is operative to control access to an enterprise network of a communication system. The gateway in accordance with an aspect of the invention comprises an alarm manager. The alarm manager receives an alarm from a vendor product that is part of a set of internal resources of the enterprise network, and routes the alarm to an external service provider for processing. The gateway receives from the service provider, responsive to the alarm, a federated identity which encompasses a plurality of technicians, expert systems or other servicing elements of the service provider. The gateway may grant one or more particular servicing elements of the service provider access to the alarm-generating vendor product based on the federated identity.

In an illustrative embodiment, the enterprise network is associated with a customer site, and the set of internal resources of the enterprise network comprises at least customer products, products from a first vendor, and products from a second vendor. The alarm manager in this embodiment is operative to route an alarm from one of the customer products to a customer support server of the customer site, to route an alarm from one of the products of the first vendor to a first external service provider, and to route an alarm from one of the products of the second vendor to a second external service provider. The first and second service providers access the respective first and second vendor products, responsive to the respective alarms therefrom, via the gateway, utilizing different federated identities.

A given service provider may authenticate a particular servicing element thereof utilizing an authentication database of the service provider. The service provider preferably transmits an identifier of the particular servicing element to the gateway along with the federated identity of the service provider. Generally, the federated identity of the service provider is authenticated by the gateway prior to granting access of the particular servicing element to the vendor product, but the identifier of the particular servicing element need not be authenticated by the gateway. Instead, the identifier of the particular servicing element could simply be logged for accountability and auditing purposes. The service provider in the illustrative embodiment communicates with the gateway utilizing an automated SSL script providing an SSL VPN based login which includes the federated identity.

The illustrative embodiment of the invention advantageously overcomes the above-noted problems of the prior art. For example, it facilitates the handling of alarms from multi-vendor products that are part of the internal resources of an enterprise network, by providing a single point of inbound and outbound access control for all service providers. It greatly simplifies the authentication process, by avoiding the need to store authentication information for each of the possibly hundreds or thousands of technicians, expert systems or other servicing elements of a given service provider. It also provides compatibility with customer security policies, while eliminating the need for service provider technicians or expert systems to maintain different sets of hardware tokens for each customer.

These and other features and advantages of the present invention will become more readily apparent from the following drawings and detailed description.

DETAILED DESCRIPTION OF THE INVENTION

The invention will be described below in conjunction with an exemplary communication system comprising an enterprise network having a plurality of servers, computers or other processing elements. It should be understood, however, that the invention is not limited to use with any particular type of communication system or any particular configuration of servers, computers or other processing elements of the system. Those skilled in the art will recognize that the disclosed techniques may be used in any communication system application in which it is desirable to provide improved handling of alarms in a secure gateway.

Figure 1:
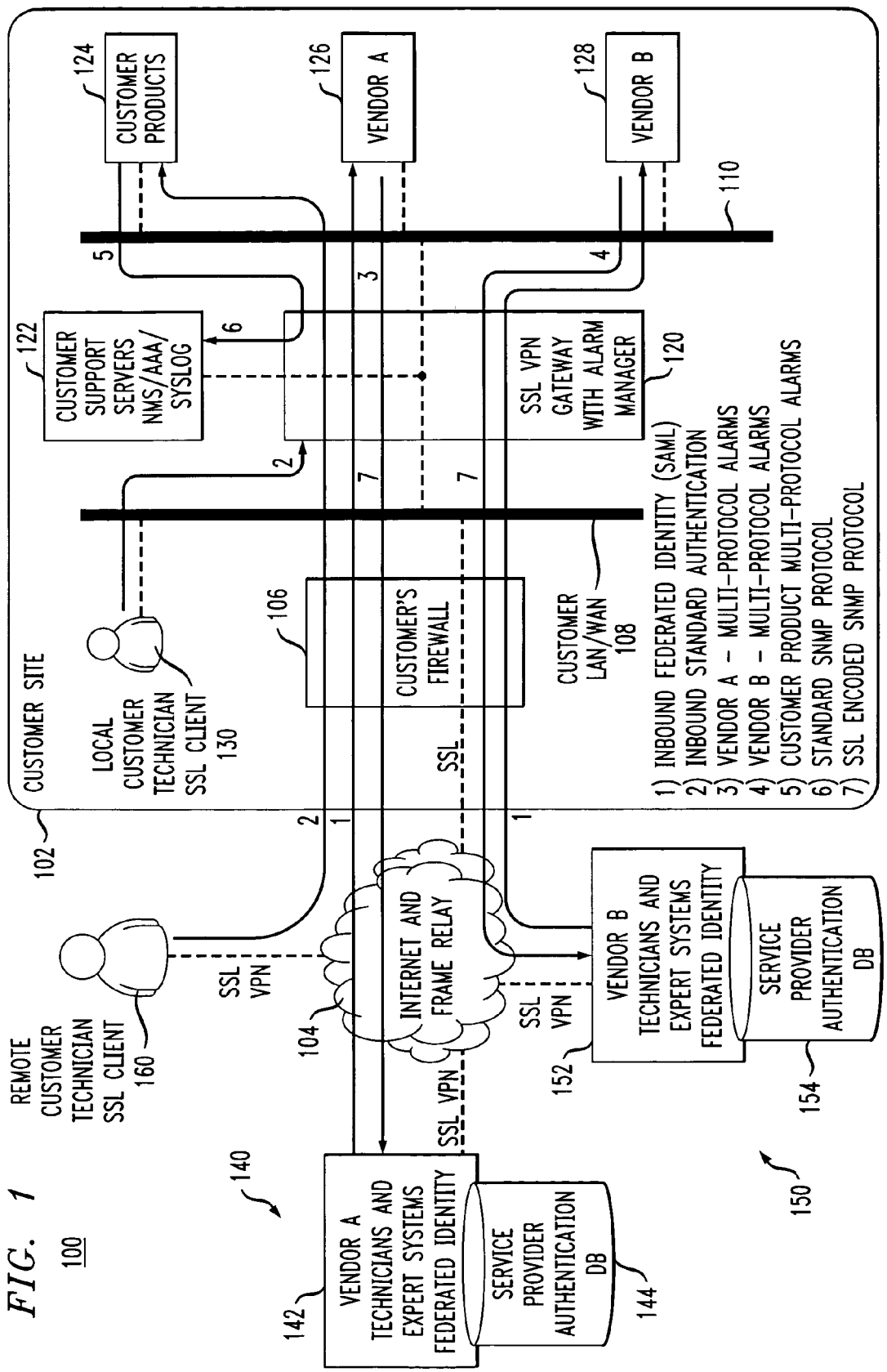
FIG. 1 shows an exemplary communication system comprising an SSL VPN gateway with an alarm manager and support for inbound federated identity in accordance with an illustrative embodiment of the invention.

FIG. 1 shows an example of a communication system 100 in accordance with an illustrative embodiment of the invention. The system 100 comprises a customer site 102 which is coupled to an external network 104. The customer site 102 comprises an enterprise network that is separated from the network 104 via a firewall 106. The enterprise network in this embodiment comprises network segments 108 and 110, which may comprise local area network (LAN) segments, wide area network (WAN) segments, or other network segments, or portions thereof, in any combination. The network segments 108, 110 are coupled to an SSL VPN gateway 120. In accordance with an aspect of the invention, the SSL VPN gateway 120 is configured to include an alarm manager, the operation of which will be described in greater detail below. The SSL VPN gateway 120 is also coupled to one or more customer support servers 122, which may comprise, by way of example, a network management system (NMS) server, an AAA server, a system log (Syslog) server, etc. These various servers may be implemented in a single computer or other processing element, or each may comprise a separate, stand-alone processing element or a set of such elements.

The enterprise network in this embodiment further comprises one or more servers or other processing elements identified as customer products 124, and additional processing elements 126 and 128. Elements 126 represent computers, servers or other processing elements that are products of a particular vendor denoted as Vendor A. Similarly, elements 128 represent computers, servers or other processing elements that are products of a particular vendor denoted as Vendor B. The enterprise network associated with customer site 102 thus has internal resources comprising multi-vendor products 126 and 128, as well as additional internal resources comprising products 124 that are the products of the customer itself. The products 124, 126 and 128 are coupled to the enterprise network segment 110 as shown.

It should be noted that the term "customer" as used in the context of the illustrative embodiment refers to an enterprise that purchases or otherwise obtains products 126 and 128 from respective vendors A and B, and that also uses one or more of its own products 124. Thus, the entity denoted as the customer in this embodiment is a customer of the vendors A and B. It is to be appreciated that the invention does not require such a customer arrangement, but is more generally applicable to any business, organization or other enterprise that has internal resources for which external access is controlled via an SSL VPN or other secure gateway.

Also, it is to be appreciated that a given processing element of the system 100 may itself comprise multiple vendor products. Thus, a given vendor product, as that term is used herein, may comprise, for example, a particular portion of a given processing element, such as a software program running on that element, a hardware component of that element, etc.

The customer site 102 also includes an SSL client device 130 of a local customer technician. This is a technician that is local to the customer site 102, behind the enterprise network firewall 106, and that supports the customer products 124. The local customer technician SSL client device 130 is coupled to the enterprise network segment 108.

The various devices of the customer site 102 need not all be at the same physical facility location. For example, the site may be a distributed site, with certain of the devices being located at different physical facilities.

The external network 104 in this embodiment represents a network supporting Internet and Frame Relay protocols, although other protocols can of course be utilized in implementing the invention. A given external or enterprise network in an embodiment of the invention may comprise, by way of example, a global communication network such as the Internet, an intranet, an extranet, a LAN, a WAN, a metropolitan area network (MAN), a wireless cellular network, or a satellite network, as well as portions or combinations of these or other wired or wireless communication networks. Implementation of the present invention thus does not require any particular type of network or set of networks.

The external network 104 is coupled to service provider 140 associated with Vendor A and service provider 150 associated with Vendor B. The service providers 140 and 150 may also be referred to herein as third-party service providers, since they may constitute entities that are separate from the customer or the product vendors. However, the invention does not require any particular relationship among the customer, service providers and vendors, and the techniques described herein can be adapted in a straightforward manner for application to other types of entities.

Service provider 140 comprises Vendor A technicians and expert systems 142 and an authentication database 144. Similarly, service provider 150 comprises Vendor B technicians and expert systems 152 and an authentication database 154. The technicians and expert systems 142, 152 may each comprise one or more expert systems, such as, for example, systems of the type described in the above-cited U.S. patent application Ser. No. 10/939,694, as well as one or more technician devices, such as computers, mobile communications devices, etc. which may be used to allow technicians to communicate with customer site 102. As will be described in greater detail below, the service providers 140 and 150 are configured to respond to alarms generated by the respective Vendor A and Vendor B products 126 and 128, by accessing said products via the SSL VPN gateway 120.

Each of the service providers 140 and 150 has a corresponding federated identity associated therewith. The federated identities of these respective system elements may be established in accordance with standards of the Liberty Alliance Project, www.projectliberty.org, as described in, for example, Liberty ID-FF Architecture Overview, Version 1.2, which is incorporated by reference herein. Generally, a federated identity combines the authentication information typically required to access multiple network entities on an individual basis, in a manner that allows a user to access all of the entities via a single sign-on using his or her federated identity. Thus, the multiple network entities are federated in that they are associated with one another into a common "circle of trust" that is accessible via the single sign-on. The identity associated with that single sign-on is referred to as a federated identity. An aspect of the invention relates to the use of federated identity to facilitate alarm response by the service providers 140 and 150, as will be described in greater detail elsewhere herein.

Also coupled to the external network 104 is an SSL client device 160 of a remote customer technician. This is a technician that is remote from the customer site 102, outside the enterprise network firewall, and that supports the customer products 124. The remote customer technician SSL client device 160 is coupled to the external network 104 via an SSL VPN.

The devices 120, 122, 124, 126, 128, 130, 140, 150 and 160 of system 100 are examples of what are more generally referred to herein as "processing elements."

Figure 2:
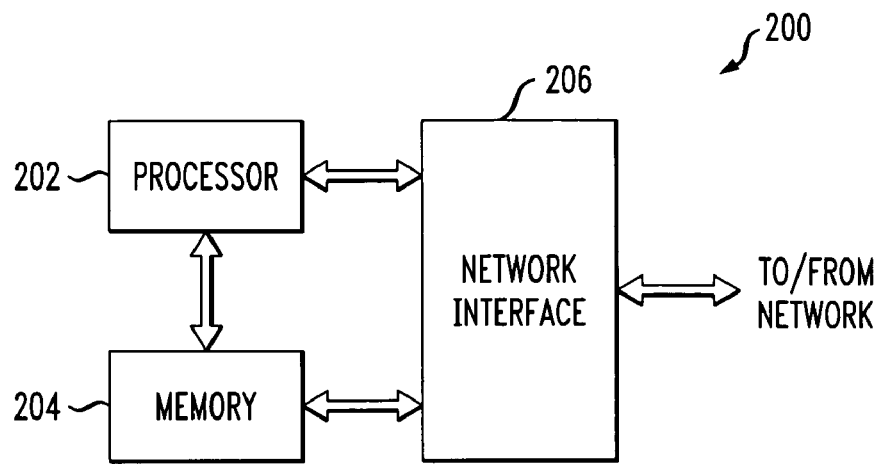
FIG. 2 is a simplified block diagram showing one possible implementation of a given processing element of the FIG. 1 system.

FIG. 2 shows a simplified block diagram of one possible implementation of a given processing element 200 of the FIG. 1 system. The processing element 200 may correspond, by way of example, to the SSL VPN gateway 120, to the customer support server(s) 122, to one of the products 124, 126 or 128, to an element of service provider 140 or 150, or to SSL devices 130 or 160. Generally, any such processing element comprises a processor 202 coupled to a memory 204 and one or more network interfaces 206. The techniques of the present invention may be implemented at least in part in the form of software storable in the memory 204 and executable by the processor 202. The memory 204 may represent random access memory (RAM), read-only memory (ROM), optical or magnetic disk-based storage, or other storage elements, as well as portions or combinations thereof.

Those skilled in the art will recognize that the individual components of FIG. 2 as shown for illustrative purposes may be combined into or distributed across one or more processing devices, e.g., a microprocessor, an application-specific integrated circuit (ASIC), a computer or other device(s).

Also, depending on which of the system devices it implements, the processing element 200 may further include additional components that are not shown in the figure but are typically associated with such a device. For example, a given processing element 200 implementing device 120, 122, 126 or 128 may comprise, for example, additional components commonly associated with an otherwise conventional computer, a server, a set of servers, etc. As another example, a given processing element 200 implementing SSL client devices 130 or 160 may comprise additional components commonly associated with an otherwise conventional mobile communication device such as a mobile telephone, personal digital assistant (PDA) or portable computer, or an otherwise conventional non-mobile communication device, such as a desktop computer, a server or a set of servers, or more generally any other type of processor-based device or set of devices suitably configured for communication with other devices of system 100. The conventional aspects of these and other devices utilizable in system 100 are well known in the art and therefore not described in further detail herein.

The system 100 may include additional elements not explicitly shown in the figure, such as additional servers, routers, gateways or other network elements. The system may also or alternatively include one or more communication system switches, such as a DEFINITY® Enterprise Communication Service (ECS) communication system switch available from Avaya Inc. of Basking Ridge, N.J., USA. As another example, a given communication switch utilizable in conjunction with the present invention may comprise MultiVantage™ communication system software, also available from Avaya Inc. The term "processing element" as used herein is intended to include such switches, as well as servers, routers, gateways or other network elements.

It is therefore to be appreciated that the present invention does not require the particular arrangements shown in FIG. 1, and numerous alternative configurations suitable for providing the alarm management and other secure gateway functionality described herein will be readily apparent to those skilled in the art.

The SSL VPN gateway 120 is configured in the illustrative embodiment to provide improved processing of alarms generated in the system 100. As noted previously, conventional SSL VPN gateways are generally not configured to deliver alarms from multi-vendor products to their associated service providers, or to allow the service providers access to the products that generated the alarms. The present invention in the illustrative embodiment solves this problem of the prior art by incorporating an alarm manager in the SSL VPN gateway to process the alarms in a manner which preserves security while significantly increasing efficiency.

Figure 3:
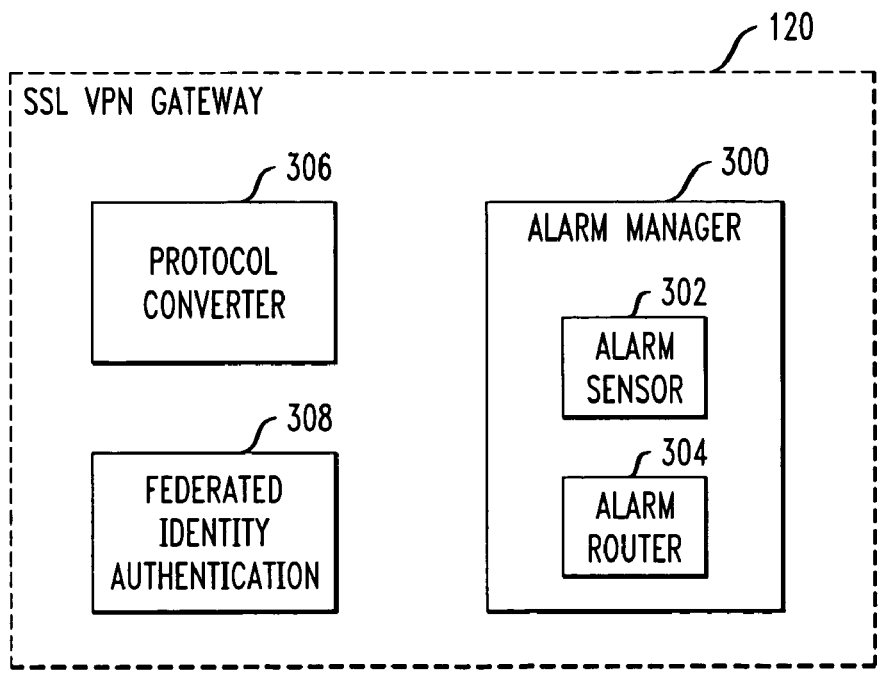
FIG. 3 is a simplified block diagram showing a number of elements of the SSL VPN gateway of the FIG. 1 system in the illustrative embodiment of the invention.

FIG. 3 shows a number of elements of the SSL VPN gateway 120 in the illustrative embodiment. In this embodiment, the SSL VPN gateway comprises an alarm manager 300, which has an alarm sensor 302 and an alarm router 304. The SSL VPN gateway further comprises a protocol converter 306 and a federated identity authentication element 308. It is to be appreciated that the SSL VPN gateway will generally also comprise additional components, of a conventional nature, which may be similar to those found in the above-listed conventional SSL VPN products from Juniper Networks, Aventail or Permeo.

The alarm manager 300, and other elements of the SSL VPN gateway 120, may be implemented at least in part using a processor and memory of the gateway, as indicated in the foregoing description of FIG. 2. Also, although elements 306 and 308 are shown as being separate from the alarm manager 300 in the illustrative embodiment, these and other SSL VPN gateway elements may be wholly or partially incorporated into the alarm manager 300 in alternative embodiments.

The alarm manager 300 in the illustrative embodiment is a multi-protocol alarm manager which receives alarms, via alarm sensor 302, from customer products 124, Vendor A products 126, and Vendor B products 128 within the enterprise network of the customer site 102. The alarm manager is "multi-protocol" in that it is capable of handling alarms generated by devices which use different protocols. The alarm router 304 determines an appropriate routing for the received alarms. For example, alarms associated with customer products 124 may be routed to local customer technician SSL client 130 or remote customer technician SSL client 160. Alarms associated with Vendor A products 126 and Vendor B products 128 may be routed to respective Vender A service provider 140 and Vendor B service provider 150.

In order to effect the desired routing, an alarm protocol used by the alarm manager 300 is converted by protocol converter 306 of the SSL VPN gateway 120 into an appropriate protocol for communication with the entity to whom the alarm is routed. For example, the SSL VPN gateway may convert a given alarm into simple network management protocol (SNMP) for local distribution to the customer support server 122. As another example, the SSL VPN gateway may convert a given alarm into SSL encoded SNMP to send to one of the external third-party service providers 140 or 150. The invention does not require any particular alarm protocol or transmission protocol, and numerous appropriate arrangements will be readily apparent to those skilled in the art.

If a given service provider 140 or 150 receives an alarm, that service provider, or an associated technician, expert system or other servicing element, can use an otherwise conventional web browser, or other access device or mechanism, to gain access to the alarm-generating product via the SSL VPN gateway 120.

The service provider 140 or 150 uses a federated identity to gain access to the alarm-generating product via the SSL VPN gateway 120. In such an arrangement, the federated identity authentication element 308 of the SSL VPN gateway 120 is utilized to authenticate the proffered federated identity. The service provider 140 or 150 may use an automated SSL script providing an SSL VPN based login which includes the federated identity. The federated identity in such an arrangement may encompass all of the technicians and expert systems associated with the service provider. Such technicians and expert systems are examples of what are more generally referred to herein as "servicing elements" of the service provider. Thus, the SSL VPN gateway in such an arrangement need only authenticate the service provider, rather than each technician or expert system on an individual basis. This advantageously avoids the above-noted problems such as those associated with requiring each service provider technician to have multiple hardware tokens for the various customers that he or she supports. In addition, this approach substantially reduces the burden on the AAA server at the customer site 102, by avoiding the need to authenticate large pools of multi-vendor service provider technicians or expert systems.

A given one of the service providers 140 or 150 would typically first authenticate its technicians or expert systems to its own authentication database 144 or 154. This is advantageous in that it allows a service provider with hundreds or thousands of technicians to authenticate those technicians using its own authentication methods. The service provider would then pass the identity of the particular technician or expert system to the SSL VPN gateway, along with the federated identity, using the above-noted automated SSL scripting. Again, the SSL VPN gateway would only need to authenticate the federated identity and not the individual identity of the technician or expert system.

The inbound federated identity of a given service provider 140 or 150 may be provided in the illustrative embodiment using the security assertion markup language (SAML) of OASIS, www.oasis-open.org, as described in, for example, SAML Version 1.0, SAML Version 1.1 and SAML Version 2.0, all of which are incorporated by reference herein. Other protocols can also or alternatively be used, such as extensible markup language (XML), simple object access protocol (SOAP), etc.

A given service provider may decide to create service divisions depending upon their technician work force skills or other factors. In such an arrangement, the federated identity passed to the SSL VPN gateway 120 responsive to an alarm might contain, for example, three entity identifiers, namely, a service provider identifier, a service provider servicing division identifier, and the identifier of a particular technician. The SSL VPN gateway may then, for example, authenticate the first two identifiers but not the third. However, the third would generally be recorded for accountability and auditing purposes. Numerous alternative arrangements of multiple identifiers to indicate particular service provider divisions may be used.

The alarm manager 300 may be pre-programmed to send alarms from various products to specific service provider alarm receivers. These alarm receivers can be, for example, SSL enabled web servers. The SSL VPN gateway 120 allows alarm traffic to flow in a secure and efficient manner from internal resources of the enterprise network to specific elements outside the customer firewall 106.

The operation of the alarm manager 300 of SSL VPN gateway 120 will now be described in greater detail with reference to FIG. 1. Communications between the various elements of system 100 are illustrated by lines which are labeled with reference numerals 1 through 7 in FIG. 1. The particular types of communications associated with these reference numerals are as follows.

Reference numeral 1 denotes an inbound federated identity communication utilizing the SAML protocol.

Reference numeral 2 denotes an inbound standard authentication.

Reference numeral 3 denotes multi-protocol alarms associated with Vendor A products 126.

Reference numeral 4 denotes multi-protocol alarms associated with Vendor B products 128.

Reference numeral 5 denotes multi-protocol alarms associated with customer products 124.

Reference numeral 6 denotes standard SNMP communications.

Reference numeral 7 denotes SSL encoded SNMP communications.

In operation, alarms from customer products 124, Vendor A products 126 or Vendor B products 128 are sent to the alarm manager 300 of SSL VPN gateway 120. Alternatively or additionally, the alarm manager 300 can periodically poll each of the products for any outstanding alarms. The alarms may be of any format, and the invention is not limited in this regard. In the illustrative embodiment, the alarms are converted using protocol converter 306 into an SNMP format.

If a given alarm is from one of the customer products 124, the alarm is routed by the alarm manager to the NMS server of the customer support servers 122, using standard SNMP communications. The NMS server or other processing element of customer site 102 may then direct the alarm to either the local customer technician 130 or remote customer technician 160 to initiate repair of the product.

If the given alarm is from one of the Vendor A products 126, the alarm is routed by the alarm manager to the service provider 140 using SSL encoded SNMP.

If the given alarm is from one of the Vendor B products 128, the alarm is routed by the alarm manager to the service provider 150 using SSL encoded SNMP.

If the local or remote customer technician is responding to the alarm, he or she accesses the alarm-generating product 124 through the SSL VPN using inbound standard authentication. It is assumed that the customer already has both local and remote technician identifiers stored in the AAA server of the customer support servers 122 so those technicians can readily authenticate to the AAA server. Thus, in this particular embodiment, federated identity is not used in the authentication of the local or remote technicians for the customer products 124. In other embodiments, authentication of such technicians may involve the use of federated identity.

If a service provider 140 or 150 is responding to the alarm, that service provider accesses the alarm-generating product 126 or 128 using an inbound federated identity. In the illustrative embodiment, the inbound federated identity is provided using SAML, although as noted elsewhere herein, other protocols such as XML-SOAP may be used. The SSL VPN gateway 120 receives both the service provider identifier, which is the federated identity, and the identifier of an individual technician or expert system of that service provider. The SSL VPN authenticates only the federated identity, that is, the service provider identifier. However, the SSL VPN will typically log both the service provider identifier and the technician or expert system identifier for accountability and auditing purposes. As mentioned previously, web scripting may be used to automate the authentication process.

The present invention in the illustrative embodiments described above provides numerous advantages relative to conventional practice. For example, it facilitates the handling of alarms from multi-vendor products that are part of the internal resources of an enterprise network, by providing a single point of inbound and outbound access control for all service providers. By allowing a service provider to authenticate its own technicians, expert systems or other servicing elements, and then utilize a federated identity to respond to an alarm, AAA server processing for the customer is greatly simplified. Instead of storing authentication information for each of the possibly hundreds or thousands of technicians, expert systems or other servicing elements of a given service provider, it need only store authentication information for the service provider itself. In addition, the illustrative embodiment provides compatibility with customer security policies, e.g., policies associated with access, monitoring, control, logging, etc. Using the techniques of the invention, customers will no longer have to call an external service provider in order to let them know of a problem that has resulted in an alarm, or provide explicit authorization to allow a particular technician or expert system of the service provider to gain access to the product in order to resolve the problem. Moreover, service provider technicians or expert systems need not maintain different sets of hardware tokens for each customer.

As previously noted, one or more of the processing functions described above in conjunction with the illustrative embodiments of the invention may be implemented in whole or in part in software utilizing processor 202 and memory 204 associated with one or more processing elements of the system. Other suitable arrangements of hardware, firmware or software may be used to implement the techniques of the invention.

It should again be emphasized that the above-described arrangements are illustrative only. Thus, it is to be appreciated that the particular elements, processing operations, communication protocols and other features shown in the figures are presented by way of example only, and should not be viewed as requirements of the invention. For example, alternative embodiments may utilize different processing element configurations, different processing operations, and different communication protocols than those of the illustrative embodiments. These and numerous other alternative embodiments within the scope of the following claims will be apparent to those skilled in the art.

What is claimed is:

1. An apparatus for use in a communication system, the apparatus comprising:

a gateway operative to control access to an enterprise network of the system;

wherein the gateway comprises an alarm manager, the alarm manager being operative to receive an alarm from a vendor product that is part of a set of internal resources of the enterprise network, and to route the alarm to an external service provider for processing; and wherein the gateway is further operative to receive from the service provider responsive to the alarm a federated identity which encompasses a plurality of servicing elements of the service provider, and to grant a particular servicing element of the service provider access to the vendor product based on the federated identity.

2. The apparatus of claim 1 wherein the gateway comprises an SSL VPN gateway.

3. The apparatus of claim 1 wherein the gateway comprises a processor coupled to a memory.

4. The apparatus of claim 3 wherein the alarm manager is implemented at least in part utilizing the processor and memory.

5. The apparatus of claim 1 wherein the enterprise network is associated with a customer site, and the set of internal resources of the enterprise network comprises at least a plurality of customer products, a plurality of products from a first vendor, and a plurality of products from a second vendor, wherein the alarm manager is operative to route an alarm from one of the customer products to a customer support server of the customer site, to route an alarm from one of the products of the first vendor to a first external service provider, and to route an alarm from one of the products of the second vendor to a second external service provider.

6. The apparatus of claim 5 wherein the first and second service providers access the respective first and second vendor products, responsive to the respective alarms therefrom, via the gateway, utilizing different federated identities.

7. The apparatus of claim 1 wherein the plurality of servicing elements of the service provider comprises at least one of a technician and an expert system.

8. The apparatus of claim 1 wherein the service provider authenticates a particular servicing element thereof utilizing an authentication database of the service provider and transmits an identifier of the particular servicing element to the gateway along with the federated identity of the service provider.

9. The apparatus of claim 8 wherein the federated identity of the service provider is authenticated by the gateway prior to granting access of the particular servicing element to the vendor product but the identifier of the particular servicing element is not authenticated by the gateway.

10. The apparatus of claim 8 wherein the identifier of the particular servicing element is logged by the gateway but not authenticated by the gateway.

11. The apparatus of claim 1 wherein the service provider communicates with the gateway utilizing an automated SSL script providing an SSL VPN based login which includes the federated identity.

12. The apparatus of claim 1 wherein the alarm is routed by the gateway to the service provider utilizing SSL encoded SNMP.

13. The apparatus of claim 1 wherein the service provider transmits the federated identity to the gateway utilizing SAML.

14. The apparatus of claim 1 wherein the service provider transmits the federated identity to the gateway utilizing XML-SOAP.

15. The apparatus of claim 1 wherein the alarm manager is implemented at least in part in the form of software running on a processor of the gateway.

16. The apparatus of claim 1 wherein the federated identity comprises a plurality of entity identifiers, each corresponding to one of a number of different hierarchical levels of the service provider, a highest one of the levels identifying the service provider itself and a lowest one of the levels identifying a particular servicing element of the service provider.

17. The apparatus of claim 16 wherein one of the plurality of entity identifiers corresponding to a level between the highest and lowest levels identifies a servicing division of the service provider, the servicing division comprising a plurality of servicing elements.

18. A method for use in gateway operative to control access to an enterprise network of a communication system, the method comprising the steps of:
- receiving an alarm from a vendor product that is part of a set of internal resources of the enterprise network;
- routing the alarm to an external service provider for processing;
- receiving from the service provider responsive to the alarm a federated identity which encompasses a plurality of servicing elements of the service provider; and
- granting a particular servicing element of the service provider access to the vendor product based on the federated identity.

19. The method of claim 18 wherein the receiving, routing and granting steps are implemented at least in part in software running on a processor of the gateway.

20. An article of manufacture comprising a machine-readable storage medium containing software code for use in a gateway operative to control access to an enterprise network of a communication system, wherein the software code when executed by a processor of the gateway causes the gateway to perform the steps of:
- receiving an alarm from a vendor product that is part of a set of internal resources of the enterprise network;
- routing the alarm to an external service provider for processing;
- receiving from the service provider responsive to the alarm a federated identity which encompasses a plurality of servicing elements of the service provider; and
- granting a particular servicing element of the service provider access to the vendor product based on the federated identity.

* * * * *

UNITED STATES PATENT AND TRADEMARK OFFICE
CERTIFICATE OF CORRECTION

PATENT NO.       : 7,590,761 B2
APPLICATION NO.  : 11/294961
DATED            : September 15, 2009
INVENTOR(S)      : Raphael et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 839 days.

Signed and Sealed this

Twenty-first Day of September, 2010

David J. Kappos
*Director of the United States Patent and Trademark Office*